United States Patent [19]

Yamazaki et al.

[11] Patent Number: 5,442,476
[45] Date of Patent: Aug. 15, 1995

[54] OPTICAL COMMUNICATION METHOD

[75] Inventors: Shuntaro Yamazaki; Takaaki Ogata, both of Tokyo, Japan

[73] Assignee: NEC Corporation, Tokyo, Japan

[21] Appl. No.: 328,401

[22] Filed: Oct. 24, 1994

Related U.S. Application Data

[63] Continuation of Ser. No. 977,071, Nov. 16, 1992, abandoned.

[30] Foreign Application Priority Data

Nov. 11, 1991 [JP] Japan ..................... 3-298636

[51] Int. Cl.⁶ ..................... H04B 10/12; H04B 10/04
[52] U.S. Cl. ..................... 359/173; 359/161; 359/181; 359/182; 359/188; 385/122
[58] Field of Search ............. 359/181, 182, 183, 191, 359/192, 173, 153, 161, 179; 385/123, 122, 24

[56] References Cited

U.S. PATENT DOCUMENTS

| | | | |
|---|---|---|---|
| 4,641,914 | 2/1987 | Sheem | 385/29 |
| 4,969,710 | 11/1990 | Tick et al. | 385/123 |
| 5,008,958 | 4/1991 | Cimini, Jr. et al. | 359/182 |
| 5,023,950 | 6/1991 | Tsushima et al. | 359/191 |
| 5,027,435 | 6/1991 | Chraplyvy et al. | 359/182 |
| 5,274,933 | 12/1993 | Prigent et al. | 385/123 |

*Primary Examiner*—Leo H. Boudreau
*Assistant Examiner*—Rafael Bacares
*Attorney, Agent, or Firm*—Ostrolenk, Faber, Gerb & Soffen

[57] ABSTRACT

An optical transmission method which suppresses waveform distortion caused by an in-optical fiber nonlinear optical effect in a long-distance coherent optical communication system. The modulation index of a transmitting station is increased or decreased with respect to the value at which the best receiver sensitivity is realized in a condition in which an optical fiber is not in its transmitting condition. Otherwise, the delay amount of a delay detection circuit of a receiving station is increased or decreased with respect to the value at which the best receiver sensitivity is realized in a condition in which the optical fiber is not in its transmitting condition.

2 Claims, 5 Drawing Sheets

OPTICAL COMMUNICATION METHOD

This is a Continuation of application Ser. No. 07/977,071 filed on Nov. 16, 1992, now abandoned.

BACKGROUND OF THE INVENTION

1. Field of the Invention

This invention relates to a method of suppressing the influence of in-fiber non-linear distortion which is undesirable in to a long-distance coherent optical communication system employing light amplifier repeaters.

2. Description of the Related Art

Optical fiber amplifier, allow the possibility of long-distance multi-stage repeatered transmission optical communication systems, several thousand km long. Coherent optical communication is considered to be an advantageous system for a long-distance transmission system. The reason is that the coherent system has advantages in that it has a high receiver sensitivity and also can compensate simply for the influence of waveform dispersion of a transmission line in an intermediate frequency (IF) band of a receiver.

However, when the output power of an optical repeater is high, distortion by a non-linear optical effect is sometimes produced in an optical fiber, which limits the transmission distance. This phenomenon is particularly prominent when tile dispersion value of an optical fiber is high as described below. When a high waveform dispersion is present in a transmission line, amplitude distortion is produced even in signal light having a fixed envelope such as frequency-shift-keying (FSK) modulated light during transmission. The amplitude distortion is converted into phase distortion of the signal light by way of the Kerr effect of the fiber. Consequently, the phase variation (frequency shift amount) of the signal light after transmission deviates from a value set in advance on the transmission side, and accordingly, the receiver sensitivity deteriorates. Since this phenomenon increases as the output power of the repeater increases, it is a serious obstacle to elongation of the repeater distance.

SUMMARY OF THE INVENTION

It is an object of the present invention to provide an optical communication method which can reduce the degradation of the receiver sensitivity remarkably.

First, the principle by which the receiver sensitivity degradation caused by in-optical fiber wavelength dispersion and the Kerr effect is reduced in accordance with the present invention will be described. When the dispersion of a transmission line is positive in the signal light wavelength region, the lower the light frequency (the longer the wavelength), the longer the delay produced in the transmission time. As the delay is produced, amplitude distortion is produced in FSK modulated signal light at the change-over point between each adjacent bits. The manner is schematically illustrated in FIG. 2. The curve (a) of FIG. 2 shows an envelope of signal light before transmission, and the curve (b) of FIG. 2 shows an envelope of the signal light deformed by the influence of dispersion after transmission. FIG. 2 is based on the assumption that the dispersion of the transmission line is in the positive and the frequency f1 on the space side of the FSK modulated light is higher than the frequency f2 on the mark side. It can be seen from the curve (b) of FIG. 2 that the amplitude decreases immediately after the bit is changed over from f1 to f2 and the amplitude increases immediately after the bit is changed over from the frequency f2 to the frequency f1. The amplitude variations vary the phase of the signal light by a Kerr effect. Since the direction of rotation of the phase increases in proportion to the power of the light, the phase lags immediately after the bit is changed over from the frequency f1 to the frequency f2 but leads immediately after the bit is changed over from f2 to f1 (Yamamore et al., "Analysis of amplifier spontaneous emission induced self-phase modulation to intensity noise conversion by fiber chromatic dispersion in optical amplifier system",*Autumnal National Conference of Electronic Information Communications Institute in* 1991 *SB*-8-4). This manner can be seen from the curves (c) and (d) of FIG. 2. In particular, the curve (c) of FIG. 2 shows the phase of signal light before transmission, and the curve (d) of FIG. 2 shows the phase of the signal light after transmission. While the variation of the phase before transmission indicates a linear characteristic as seen from the curve (c) of FIG. 2. the phase variation after transmission presents a non-linear behavior as seen from the curve (d) of FIG. 2 at the change-over point between adjacent bits. It can be seen from FIG. 2 that the variation of the phase after transmission is greater than the variation of the phase before transmission.

On the contrary, when the dispersion value is negative, the variation of the phase after transmission decreases as compared with that before transmission as can be seen from FIG. 3. When such a phase detecting circuit as a delay detector is employed for a demodulating circuit, the demodulation waveform deteriorates by the deviation of the phase variation.

According to a first aspect of the present invention, there is provided an optical communication method for a frequency-shift-keying coherent optical communication system employing an optical frequency-shift-keying system, which comprises the step of setting, when the dispersion value of an optical fiber serving as a transmission line is positive or negative, the modulation index at a transmitting station to a smaller value or a greater value, respectively, than the value at which the best receiver sensitivity is realized in a condition in which the optical fiber is not in its transmitting condition thereby to suppress the receiver sensitivity degradation caused by non-linear distortion which is produced in the optical fiber.

With the optical communication method, the waveform distortion is suppressed to its minimum level by setting, in anticipation of an increase or a decrease the phase variation, the frequency shift amount to a lower or a higher value on the transmitting station. The curves (e) of FIGS. 2 and 3 illustrate variations in phase after transmission when the present method is used. In particular, the curves (e) of FIGS. 2 and 3 show phases of signal light after transmission when the modulation index is adjusted. It can be seen that the phase variation within one bit substantially coincides with that before transmission.

According to a second aspect of the present invention, there is provided an optical communication method for a frequency-shift-keying coherent optical communication system employing an optical frequency-shift-keying delay detection system, which comprises the step of setting, when the dispersion value of an optical fiber serving as a transmission line is positive or negative, the delay amount at a delay detection circuit of a receiving station to a smaller value or a greater value, respectively, than the value at which the best receiver sensitivity is realized in a condition in which the optical fiber is not in its transmitting condition thereby to suppress the receiver sensitivity degradation caused by non-linear distortion which is produced in the optical fiber.

With the optical communication method, a demodulating circuit which is optimized to an increased phase variation is used. A delay detection circuit has the characteristic of being capable of demodulating a frequency-shift-keying modulated signal having a great frequency shift amount by decreasing the delay time. Making use of this characteristic, distortion of the waveform can be suppressed by decreasing the delay time in accordance with the increase of the phase variation, that is, an increase of the frequency shift amount.

With these optical communication methods, the receiver sensitivity degradation caused by dispersion in the optical fiber and the non-linear optical effect can be reduced remarkably.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
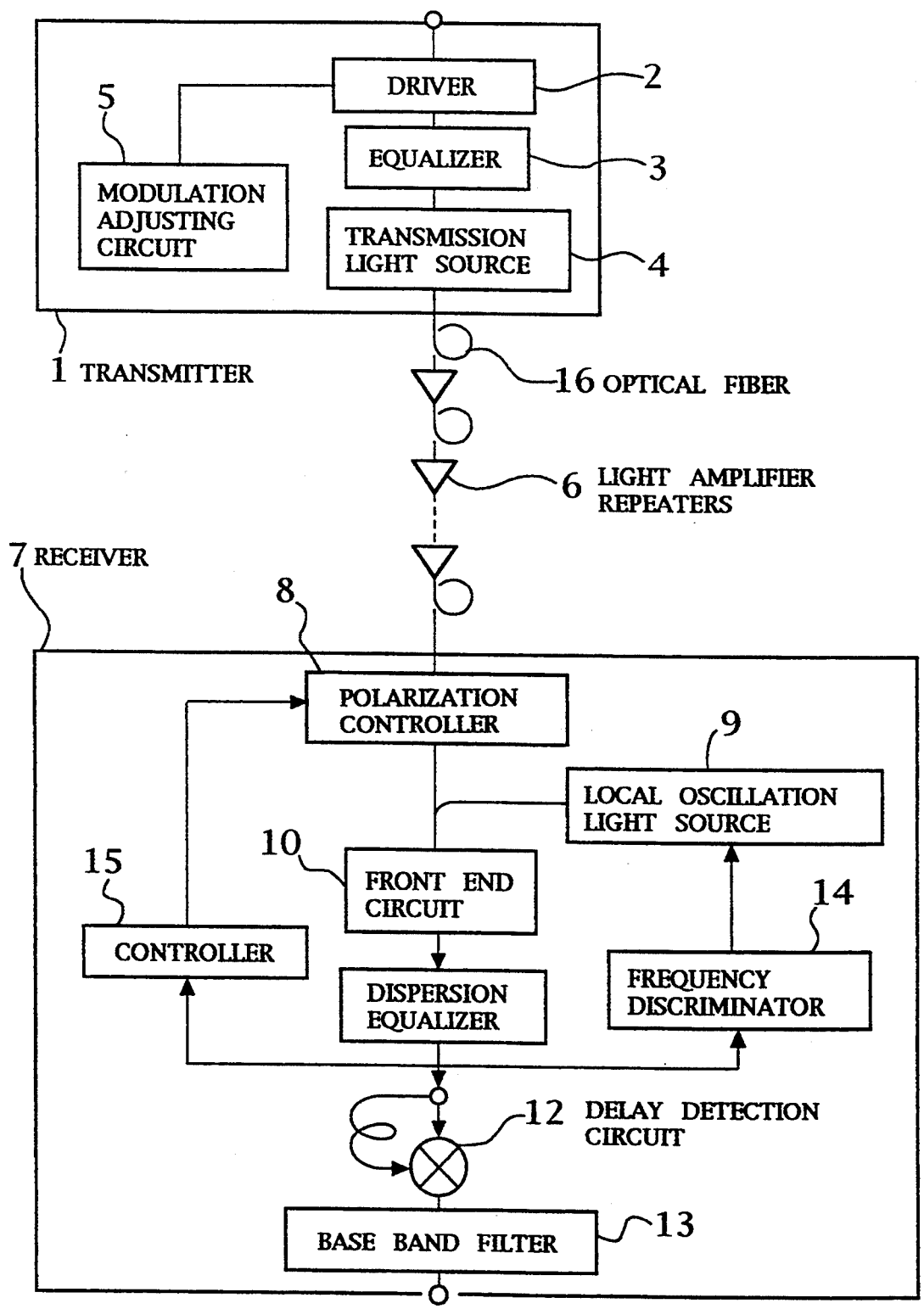
FIG. 1 is a block diagram showing a transmission system to which the present invention is applied.
Figure 2:
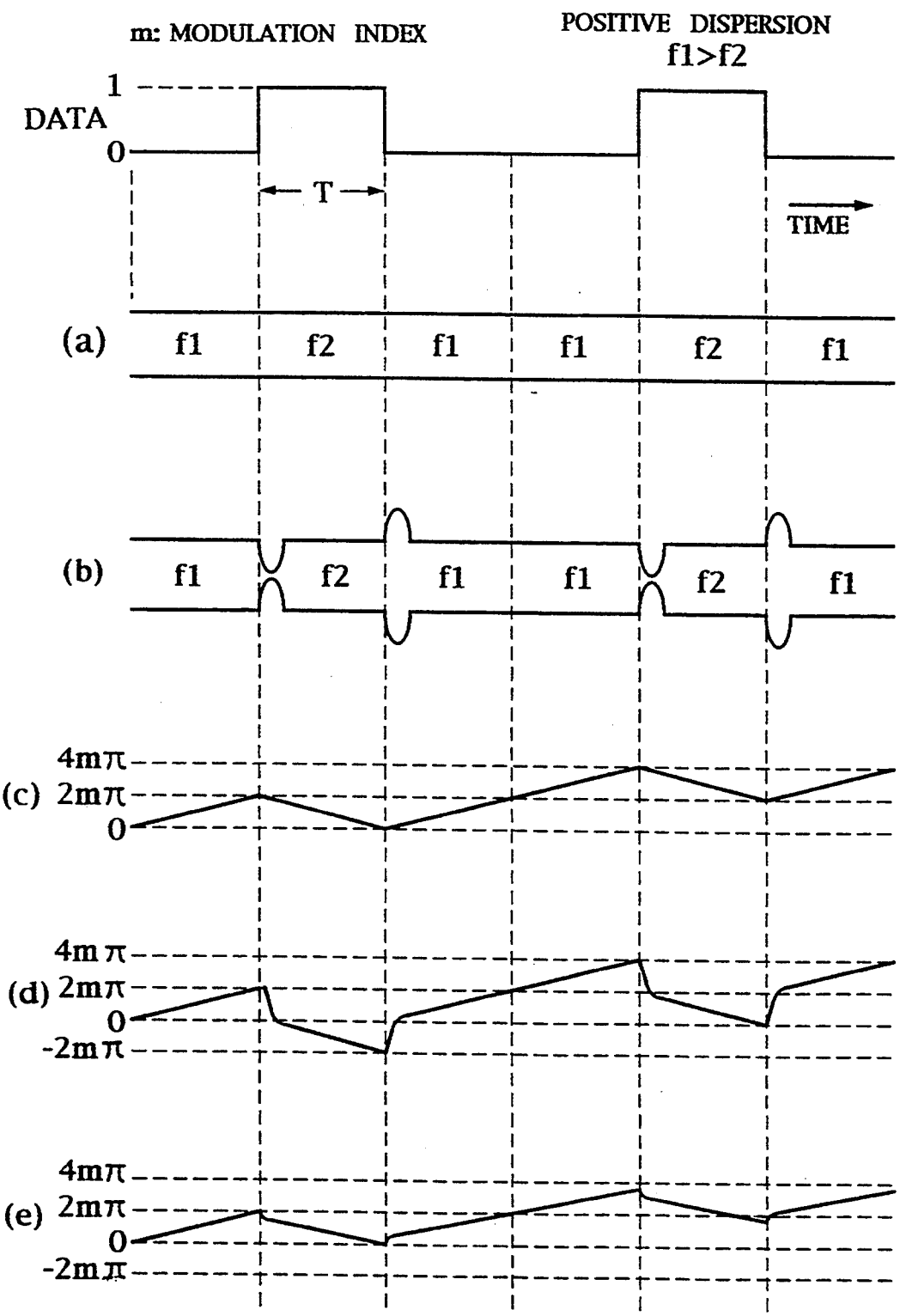
FIG. 2 is a diagram illustrating a portion of the principle of the present invention.
Figure 3:
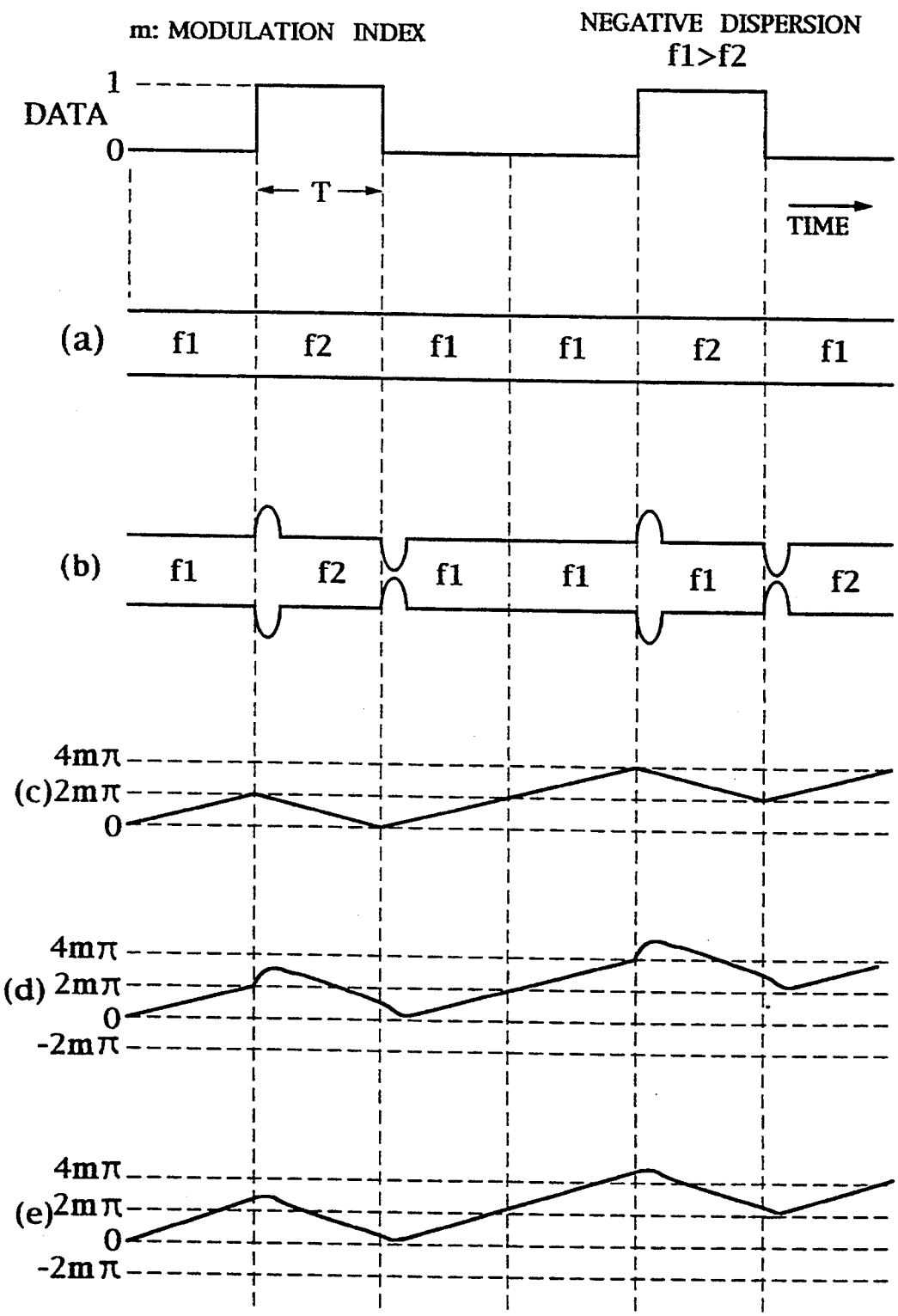
FIG. 3 is a a diagram illustrating another portion of the principle of the present invention.

First, an optical communication method as defined by the first aspect of the present invention will be described. FIG. 1 shows a 2.5 Gb/s CPFSK optical heterodyne detection transmission system of the transmission distance of 800 km to which the present invention is applied. A transmitter 1 includes a driver circuit 2 from which a current modulated signal corresponding to an input data signal is outputted. The current modulated signal is supplied to an equalizer 3, at which it is equalized in advance for the frequency characteristic of a transmission light source 4, and then, it is applied to the transmission light source 4. Meanwhile, the current amplitude of a current modulating signal, that is, the modulation index, is controlled to a suitable value by a modulation index controlling circuit 5.

Signal light emitted from the transmitter 1 is received by a receiver 7 after passing seven light amplifier repeaters 6 installed in a spaced relationship from each other by the distance of 100 km. The average of the light output power of each of the light amplifier repeaters 6 is +8 dBm. The dispersion value of an optical fiber 16 of the transmission line is 17 ps/nm/km in the 1.55 micron band of the signal light wavelength. A polarization controller 8 is provided in the receiver 7, and the polarization of signal light is controlled by a controller 15 so that an intermediate frequency signal may be maximum. After light emitted from a local oscillation light source 9 and the signal light are combined, it is heterodyne detected by a front end circuit 10. The center emission of the intermediate frequency signal outputted from the front end circuit 10 is set to 5 GHz, and from the signal, distortion caused by waveform dispersion is removed by a dispersion equalizer 11. A frequency discriminator 14 controls the frequency of the local oscillation light source 9 so that the intermediate frequency signal may be stabilized at 5 GHz. A delay detection circuit 12 has a delay time set so that a maximum demodulation amplitude may be obtained when the modulation index of the signal light is 0.8 (frequency shift amount 2 GHz). The output of the delay detection circuit 12 is inputted to a base band filter 13 having the cut-off frequency of 2.5 GHz, at which noise is removed from the input signal.

Figure 4:
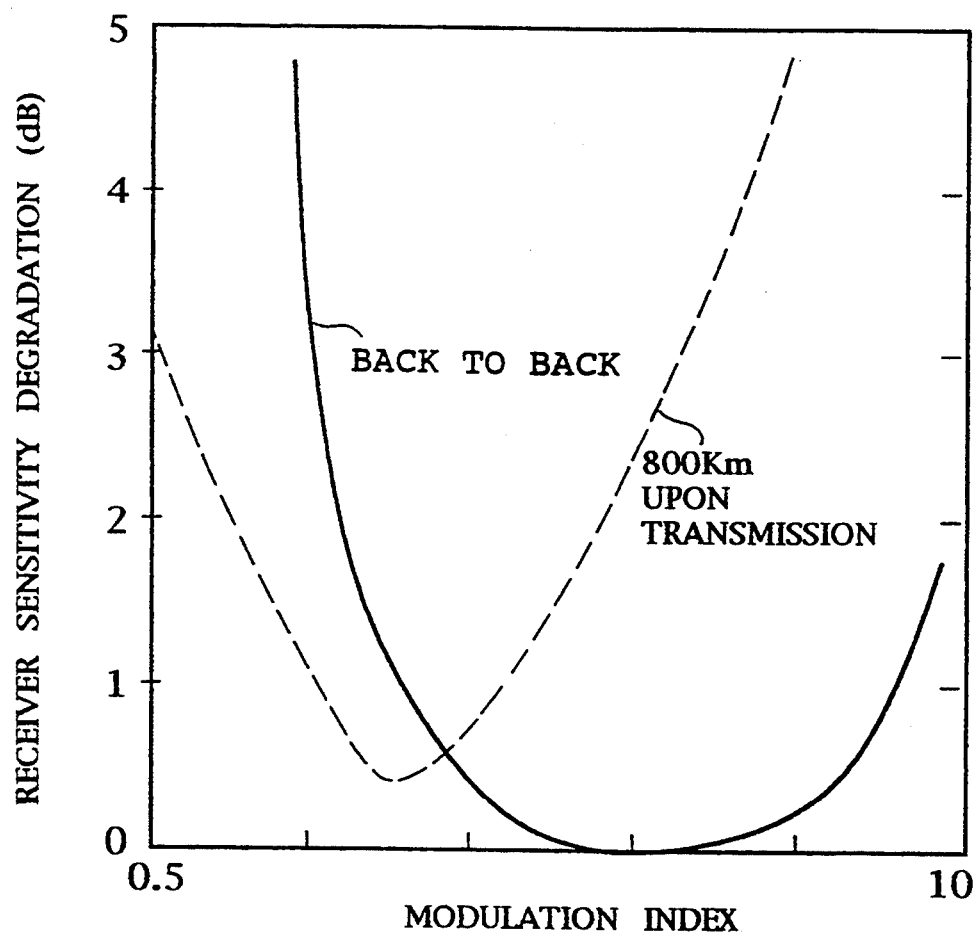
FIG. 4 is a diagram illustrating an advantage according to a first aspect of the present invention.

FIG. 4 illustrates results of measurements of the modulation index dependency of the receiver sensitivity degradation when signal light is not launched and is launched into the 800 km transmission line. It can be seen from FIG. 4 that, by setting the modulation index to 0.64, the receiver sensitivity degradation of 2.4 dB can be suppressed to 0.4 dB to the utmost.

Figure 5:
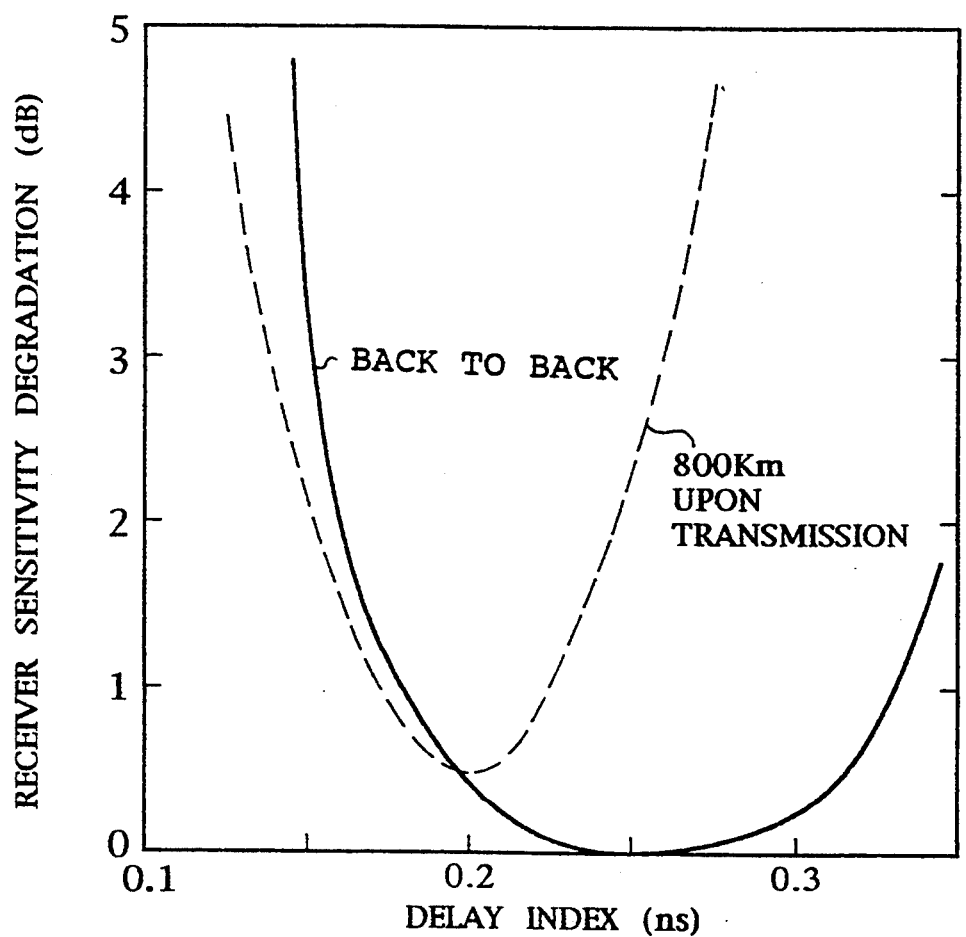
FIG. 5 is a diagram illustrating an advantage according to a second aspect of the present invention.

Subsequently, an optical communication method as defined by the second aspect of the present invention will be described. In the present embodiment, the optical communication method as defined by the second aspect of the present invention is applied to the system of FIG. 1. The modulation index of signal light is set to 0.8. The dependency of the receiver sensitivity degradation upon the delay time of the delay detection circuit 12 is illustrated in FIG. 5. It can be seen from this figure that the receiver sensitivity is highest when the delay time is 0.25 ns. When transmission was effected while the delay time was fixed, the sensitivity degradation of 2.5 dB was produced. Then, when the delay time was reduced to 0.2 ns, the receiver sensitivity degradation was reduced to 0.5 dB. It is to be noted that, as the delay time was reduced, the IF center frequency was changed to 6.25 GHz.

While the dispersion of an optical fiber is set in the positive embodiments described above, on the contrary when the dispersion is negative, the sensitivity degradation can be reduced by increasing the modulation index or by increasing the delay time.

Since a theoretically optimum modulation index or delay amount can be calculated if the positive or negative sign and a value of dispersion of the optical fiber is known, the circuit parameters should be determined from the result of the calculation so that the receiver sensitivity may have the relationship described above. Further, it is readily possible from the prior art to adjust the circuit parameters arbitrarily to suitable values.

Having now fully described the invention, it will be apparent to one of ordinary skill in the art that many changes and modifications can be made thereto without departing from the spirit and scope of the invention as set forth herein.

What is claimed is:

1. An optical communication method for a frequency-shift-keying coherent optical communication system having a transmitter station and a receiver connected by an optical fiber and which employs optical frequency-shift-keying, the optical fiber having a fixed dispersion value, the method comprising the steps of:
   setting a modulation index at a transmitting station, when the dispersion value of said optical fiber is positive, to a smaller value than a value at which the best receiver sensitivity is realized in a condition in which said optical fiber is not in a transmitting condition; and setting the modulation index at the transmitting station, when the dispersion value of said optical fiber is negative, to a greater value than a value at which the best receiver sensitivity is realized in a condition in which said optical fiber is not in a transmitting condition;

thereby to suppress receiver sensitivity degradation caused by non-linear distortion which is produced in said optical fiber.

2. An optical communication method for a frequency-shift-keying coherent optical communication system having a transmitting station and a receiving station connected by an optical fiber and which employs optical frequency-shift keying, the optical fiber having a fixed dispersion value, the method comprising the steps of:

setting a delay amount at a delay detection circuit of the receiving station, when the dispersion value of said optical fiber is positive, to a smaller value than a value at which the best receiver sensitivity is realized in a condition in which said optical fiber is not in a transmitting condition; and setting the delay amount at the delay detection circuit of the receiving station, when the dispersion value of said optical fiber is negative, to a greater value than a value at which the best receiver sensitivity is realized in a condition in which said optical fiber is not in a transmitting condition;

thereby to suppress receiver sensitivity degradation caused by non-linear distortion which is produced in said optical fiber.

* * * * *

UNITED STATES PATENT AND TRADEMARK OFFICE
CERTIFICATE OF CORRECTION

PATENT NO. : 5,442,476
DATED : August 15, 1995
INVENTOR(S) : Shuntaro YAMASAKI et al.

It is certified that error appears in the above-indentified patent and that said Letters Patent is hereby corrected as shown below:

Title page, item 30, for "Foreign Application Priority Data November 11, 1991 [JP] Japan........3-298636" should be corrected to --Foreign Application Priority Data November 14, 1991 [JP] Japan..........3-298636--

Signed and Sealed this

Thirtieth Day of January, 1996

Attest:

BRUCE LEHMAN

Attesting Officer

Commissioner of Patents and Trademarks